(12) United States Patent
Moriguchi et al.

(10) Patent No.: US 8,998,062 B2
(45) Date of Patent: Apr. 7, 2015

(54) ROTARY TOOL

(75) Inventors: Hideki Moriguchi, Itami (JP); Hiroka Aoyama, Itami (JP); Yoshiharu Utsumi, Itami (JP); Hidetoshi Fujii, Suita (JP); Yoshiaki Morisada, Osaka (JP)

(73) Assignees: Sumitomo Electric Industries, Ltd., Osaka-shi (JP); Osaka University, Suita-shi (JP); Osaka Municipal Technical Research Institute, Osaka-shi (JP)

( * ) Notice: Subject to any disclaimer, the term of this patent is extended or adjusted under 35 U.S.C. 154(b) by 0 days.

(21) Appl. No.: 13/995,386

(22) PCT Filed: Dec. 14, 2011

(86) PCT No.: PCT/JP2011/078897
§ 371 (c)(1),
(2), (4) Date: Jun. 18, 2013

(87) PCT Pub. No.: WO2012/086490
PCT Pub. Date: Jun. 28, 2012

(65) Prior Publication Data
US 2013/0284793 A1    Oct. 31, 2013

(30) Foreign Application Priority Data
Dec. 22, 2010  (JP) .................................. 2010-286003

(51) Int. Cl.
B23K 20/12    (2006.01)

(52) U.S. Cl.
CPC ......... B23K 20/1245 (2013.01); B23K 20/1255 (2013.01)

(58) Field of Classification Search
None
See application file for complete search history.

(56) References Cited

U.S. PATENT DOCUMENTS

| | | | | |
|---|---|---|---|---|
| 5,697,994 | A * | 12/1997 | Packer et al. | 51/309 |
| 6,187,421 | B1 * | 2/2001 | Moriguchi et al. | 428/216 |
| 6,299,658 | B1 * | 10/2001 | Moriguchi et al. | 51/307 |
| 2001/0038028 | A1 | 11/2001 | Iwashita | |

(Continued)

FOREIGN PATENT DOCUMENTS

| | | |
|---|---|---|
| EP | 2591874 A1 * | 5/2013 |
| JP | 58-104174 | 6/1983 |

(Continued)

OTHER PUBLICATIONS

PCBN Blank (no date available).*

(Continued)

*Primary Examiner* — Kiley Stoner
(74) *Attorney, Agent, or Firm* — Venable LLP; Michael A. Sartori; Tamatane J. Aga

(57) ABSTRACT

There is provided a tool for friction stir welding, in which a coating layer is less likely to peel off from a base material and excellent wear resistance is achieved. The tool for friction stir welding according to the present invention includes a base material (BM) and a coating layer. The BM includes a first hard phase (FP) formed by WC particles, a second hard phase (SP) and a binder phase (BP). The SP is formed by a compound of one or more metals selected from Ti, Zr, Hf, Nb, Ta, Cr, Mo, and W and one or more elements selected from nitrogen, carbon, boron, and oxygen, and is included in the BM at a volume ratio of 3% to 30%. The BP is included in the BM at a volume ratio of 8% to 28%. The FP is higher than the SP in terms of volume ratio.

7 Claims, 1 Drawing Sheet

(56) References Cited

U.S. PATENT DOCUMENTS

| | | | |
|---|---|---|---|
| 2005/0126336 A1 | 6/2005 | Jansson et al. | |
| 2006/0049234 A1* | 3/2006 | Flak et al. | 228/112.1 |
| 2007/0119276 A1* | 5/2007 | Liu | 75/232 |
| 2007/0187465 A1* | 8/2007 | Eyre et al. | 228/101 |
| 2007/0196694 A1 | 8/2007 | Jansson et al. | |
| 2007/0241167 A1 | 10/2007 | Gendou et al. | |
| 2009/0260299 A1* | 10/2009 | Liu et al. | 51/309 |
| 2010/0038408 A1* | 2/2010 | Keshavan et al. | 228/112.1 |
| 2010/0038832 A1* | 2/2010 | Rosal et al. | 266/46 |
| 2010/0255264 A1* | 10/2010 | Ishida et al. | 428/172 |
| 2010/0258612 A1* | 10/2010 | Kolbeck et al. | 228/2.1 |
| 2010/0279146 A1* | 11/2010 | Rowe et al. | 428/650 |
| 2012/0186160 A1* | 7/2012 | Morisada et al. | 51/307 |
| 2012/0248175 A1* | 10/2012 | Moriguchi et al. | 228/112.1 |
| 2013/0000213 A1* | 1/2013 | Okamura et al. | 51/307 |
| 2013/0062395 A1* | 3/2013 | Nelson et al. | 228/2.1 |
| 2013/0087604 A1* | 4/2013 | Moriguchi et al. | 228/112.1 |

FOREIGN PATENT DOCUMENTS

| | | | | |
|---|---|---|---|---|
| JP | 07-505090 | | | 6/1995 |
| JP | 2001-314983 | | | 11/2001 |
| JP | 2002-356734 | A | | 12/2002 |
| JP | 2003-507578 | | | 2/2003 |
| JP | 2003-326372 | A | | 11/2003 |
| JP | 2004-195480 | | | 7/2004 |
| JP | 2005-126824 | A | | 5/2005 |
| JP | 2005-152909 | A | | 6/2005 |
| JP | 2005-199281 | A | | 7/2005 |
| JP | 2007-283324 | A | | 11/2007 |
| JP | 2008-133509 | A | * | 6/2008 |
| JP | 2009-543696 | | | 12/2009 |
| JP | 2011-062742 | A | * | 3/2011 |
| SE | WO 96/36465 | | * | 11/1996 |
| WO | WO-93/10935 | | | 6/1993 |
| WO | WO-01/14608 | | | 3/2001 |
| WO | WO-2007/089882 | | | 8/2007 |
| WO | WO-2009/062216 | | | 5/2009 |
| WO | WO 2010/110197 | A | * | 9/2010 |

OTHER PUBLICATIONS

Miyazaki et al., U.S. Appl. No. 13/995,321, "Rotary Tool," filed Jun. 18, 2013.

Miyazaki et al., U.S. Appl. No. 13/995,355, "Rotary Tool," filed Jun. 18, 2013.

International Search Report in PCT International Application No. PCT/JP2011/078895, dated Jan. 24, 2012.

International Search Report in PCT International Application No. PCT/JP2011/078896, dated Jan. 24, 2012.

International Search Report in PCT International Application No. PCT/JP2011/078897, dated Jan. 24, 2012.

Office Action in U.S. Appl. No. 13/995,321, dated Feb. 21, 2014.

Notice of Grounds of Rejection issued in Japanese Patent Application No. 2010-285953 dated Jun. 24, 2014.

Notice of Grounds of Rejection issued in Japanese Patent Application No. 2010-286003 dated Jun. 24, 2014.

\* cited by examiner

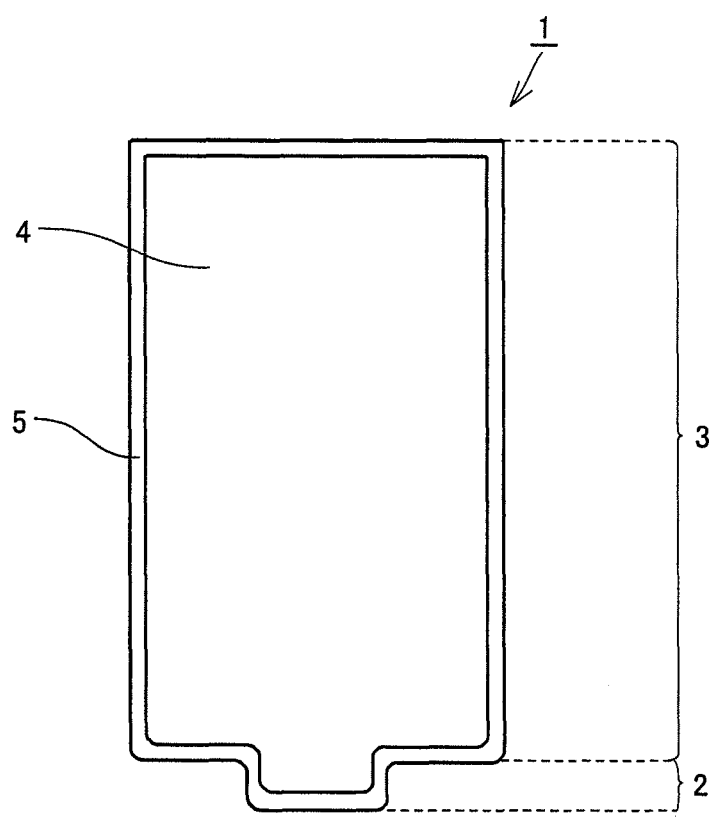

ROTARY TOOL

TECHNICAL FIELD

The present invention relates to a tool for friction stir welding.

BACKGROUND ART

In 1991, a friction stir welding technique of joining metal materials such as aluminum alloys was established in the United Kingdom. This technique is for joining metal materials by pressing a cylindrical tool for friction stir welding having a small-diameter protrusion at a tip thereof against joint surfaces of the metal materials to be joined and rotating the tool for friction stir welding, generating frictional heat, and softening and plastically flowing the metal materials at a joint portion by the frictional heat (Japanese National Patent Publication No. 7-505090 (PTL 1)).

"Joint portion" herein refers to a joint interface portion where joining of metal materials by butting the metal materials or placing one metal material on top of the other metal material is desired. In friction stir welding, the metal materials near this joint interface are softened, plastic flow occurs, and the metal materials are stirred. As a result, the joint interface disappears and joining is performed. Furthermore, dynamic recrystallization occurs at the metal materials at the same time. Due to this dynamic recrystallization, the metal materials near the joint interface become fine particles and the metal materials can be joined with high strength.

When aluminum alloys are used as the above-mentioned metal materials, plastic flow occurs at a relatively low temperature of approximately 500° C. Therefore, even when the tool for friction stir welding made of inexpensive tool steel is used, little wear and tear occurs and frequent replacement of the tool is unnecessary. Therefore, in the friction stir welding technique, the cost required to join the aluminum alloys is low. Thus, in place of a resistance welding method for melting and joining aluminum alloys, the friction stir welding technique has already been in practical use in various applications as a technique of joining components of a railroad vehicle, a vehicle or an aircraft.

At present, the friction stir welding technique is mainly applied to nonferrous metals such as an aluminum alloy, a magnesium alloy and a steel alloy in which plastic flow occurs at a relatively low temperature. This friction stir welding technique is superior to the resistance welding method in terms of cost and time required for joining, strength of the joint portion, and the like. Therefore, there is a need for applying the friction stir welding technique to not only joining of the materials in which plastic flow occurs at a low temperature, but also joining of steel materials in which plastic flow occurs at a high temperature of 1000° C. or higher. In the following, various processing using the friction stir welding technique will be referred to as friction stir welding processing.

However, in friction stir welding under high temperature, the temperature of the stirred portion rises to a temperature near the melting point of the materials to be joined. Therefore, during joining, the materials to be joined react with a base material of the tool for friction stir welding, and thus, alloying of the base material progresses or the components of the base material dissolve in the materials to be joined. As a result, wear tends to progress. Furthermore, chipping or breaking tends to occur at a probe portion of the tool for friction stir welding, and thus, shortening of the tool life is a serious problem.

The friction stir welding processing is broadly divided into friction stir welding (FSW) and friction spot joining (spot FSW) In friction stir welding, the tool for friction stir welding is inserted into the materials to be joined and frictional heat is generated, and in this state, the materials to be joined are continuously joined. On the other hand, in friction spot joining, the tool for friction stir welding is moved away from the materials to be joined every two to three seconds, and the materials to be joined are intermittently joined. Therefore, in friction spot joining, heating and cooling are alternately repeated and the tool for friction stir welding comes into contact with the air whenever joining is performed, and thus, a surface of the tool for friction stir welding is exposed to the oxidation environment and is oxidized easily. As a result, shortening of the tool life is prominent.

A method for coating a surface of the base material with a ceramic coating layer made of TiN, TiCN, alumina and the like is also promising as a method for making oxidation less likely to occur on the surface of the base material. It is believed that by using the coating layer of such a composition, exposure of the base material can be reduced and the oxidation resistance of the tool for friction stir welding can be enhanced.

This coating layer is, however, likely to peel off from the base material when the materials to be joined having a melting point of 1000° C. or higher are joined. Therefore, a surface of a shoulder portion is oxidized easily, and the tool life is short. In addition, the joining quality is not excellent.

Japanese Patent Laying-Open No. 2001-314983 (PTL 2) discloses a technique of increasing the surface hardness by using cemented carbide or the like having a hardness higher than that of materials to be joined as a material for a base material. Furthermore, Japanese Patent Laying-Open No. 2005-152909 (PTL 3) discloses a technique of coating a surface of a base material with diamond-like carbon or a ceramic film made of TiN and the like.

CITATION LIST

Patent Literature

PTL 1: Japanese National Patent Publication No. 7-505090
PTL 2: Japanese Patent Laying-Open No. 2001-314983
PTL 3: Japanese Patent Laying-Open No. 2005-152909

SUMMARY OF INVENTION

Technical Problem

The diamond-like carbon film disclosed in PTL 3 is, however, intended to block adhesion of a joining material metal and has low oxidation resistance. Therefore, when the materials to be joined having a melting point of 1000° C. or higher are joined, a surface of the diamond-like carbon film is oxidized easily, which does not contribute to prolonging of the life of the tool for friction stir welding. In addition, coating with the ceramic film is intended to prevent adhesion of a metal forming the materials to be joined, and measures are not taken against the problem that the coating film is likely to peel off when the materials to be joined having a melting point of 1000° C. or higher are joined.

When the friction stir welding technique is applied to the steel materials, the tool for friction stir welding itself is also exposed to a high temperature during joining. As a result, plastic deformation of the tool for friction stir welding is likely to occur. Moreover, a portion of the tool for friction stir welding that is in contact with the materials to be joined, and in particular a shoulder portion, is easily oxidized and expanded. If friction stir welding is continued, with the portion having been oxidized and expanded, there arises a problem that a burr is produced at the joint portion and the joining quality becomes worse, and a problem that the oxidized portion reaches a high temperature and falls off and wear of the shoulder portion tends to progress.

The present invention has been made in view of the above-mentioned circumstances, and an object of the present invention is to provide a tool for friction stir welding, in which the coating layer is less likely to peel off from the base material, excellent wear resistance is achieved, progress of damage to the shoulder portion of the tool for friction stir welding is suppressed, and the heat crack resistance is enhanced, even under the harsh environment where heating and cooling are repeated. As a result, there can be provided a tool for friction stir welding that is excellent in joining quality.

Solution to Problem

Conventionally, the tool for friction stir welding made of the tool steel was first put to practical use in joining of materials such as aluminum and magnesium that have a low melting point and are easily welded. Therefore, the subsequent development policy focused attention exclusively on how to use a material having excellent hardness or a material having excellent welding resistance, such as using cemented carbide as a material for the base material to achieve a high hardness or coating the base material with a diamond coating having excellent welding resistance.

The inventors of the present invention made various studies in order to extend the range of application of the materials to be joined that could be joined by the tool for friction stir welding. However, through the conventional approach, it was considered difficult to extend the range of application of the materials to be joined to materials having a high melting point of 1000° C. or higher. Therefore, the inventors of the present invention studied various approaches of enhancing the performance of the tool for friction stir welding by methods other than material strength.

As a result of their study, the inventors of the present invention noticed that cemented carbide forming the base material has a thermal expansion coefficient of $4 \times 10^{-6}/°$ C. or more and $5 \times 10^{-6}/°$ C. or less, whereas the ceramic coating layer formed on the surface of the base material has a thermal expansion coefficient of $7 \times 10^{-6}/°$ C. or more and $9 \times 10^{-6}/°$ C. or less, and the ceramic coating layer has a larger thermal expansion coefficient. The inventors of the present invention estimated that this could be the cause of the fact that the ceramic coating layer is likely to peel off from the base material during friction stir welding of steel and the like. In other words, in friction stir welding of the materials to be joined having a melting point of 1000° C. or higher, the tool for friction stir welding is rapidly cooled after the end of joining, and shear stress is generated at the coating layer due to a difference in thermal expansion coefficient between the base material and the ceramic coating layer, which may make the coating layer likely to peel off from the base material.

Thus, in order to decrease the difference in thermal expansion coefficient between the base material and the coating layer, the inventors of the present invention considered adding, to the base material, a compound of one or more metals selected from the group consisting of Ti, Zr, Hf, Nb, Ta, Cr, Mo, and W and one or more elements selected from the group consisting of nitrogen, carbon, boron, and oxygen, or a solid solution of the compound (except for WC). As a result, by adding the above-mentioned compound or solid solution at a ratio of 3% by volume or more and 30% by volume or less, adhesiveness between the base material and the coating layer was enhanced. The tool for friction stir welding, which exhibited excellent performance that could not be obtained through the conventional method, was thus completed.

In other words, a tool for friction stir welding according to the present invention is used in friction stir welding processing, wherein the tool for friction stir welding includes a base material and a coating layer formed on the base material, the base material includes a first hard phase, a second hard phase and a binder phase, the first hard phase is formed by WC particles, the second hard phase is formed by a compound of one or more metals selected from the group consisting of Ti, Zr, Hf, Nb, Ta, Cr, Mo, and W and one or more elements selected from the group consisting of nitrogen, carbon, boron, and oxygen, or a solid solution of the compound (except for WC), and is included in the base material at a volume ratio of 3% by volume or more and 30% by volume or less, the binder phase is formed by an iron group metal and is included in the base material at a volume ratio of 8% by volume or more and 28% by volume or less, and a constituting ratio between the first hard phase and the second hard phase is such that the first hard phase is higher than the second hard phase in terms of volume ratio.

Preferably, the second hard phase is formed by carbide, nitride or carbonitride of one or more metals selected from the group consisting of Ti, Zr, Hf Nb, Ta, Cr, Mo, and W.

Preferably, a volume ratio of nitride and/or carbonitride to the second hard phase is 30% by volume or more and 100% by volume or less. Preferably, the WC particles have an average particle size of 3 μm or larger. Preferably, the coating layer has oxidation resistance at 1000° C. or higher, and is formed by a physical vapor deposition method. When friction stir welding processing using the tool for friction stir welding is friction spot joining, the tool for friction stir welding can offer particularly excellent performance.

Advantageous Effects of Invention

Since the tool for friction stir welding according to the present invention has the above-mentioned configuration, the tool for friction stir welding exhibits such excellent performance that the coating layer of the tool for friction stir welding is less likely to peel off and excellent wear resistance and joining quality are achieved.

BRIEF DESCRIPTION OF DRAWINGS

FIG. 1 is a schematic cross-sectional view of a tool for friction stir welding according to the present invention.

DESCRIPTION OF EMBODIMENTS

The present invention will be described in more detail hereinafter.

<Tool for Friction Stir Welding>

FIG. 1 is a schematic cross-sectional view of a tool for friction stir welding according to the present invention. A tool 1 for friction stir welding according to the present invention is used in friction stir welding processing, wherein tool 1 for friction stir welding includes a base material 4 and a coating layer 5 formed on base material 4 as shown in FIG. 1, base material 4 includes a first hard phase, a second hard phase and a binder phase, the first hard phase is formed by WC particles, the second hard phase is formed by a compound of one or more metals selected from the group consisting of Ti, Zr, Hf, Nb, Ta, Cr, Mo, and W and one or more elements selected from the group consisting of nitrogen, carbon, boron, and oxygen, or a solid solution of the compound (except for WC), and is included in the base material at a volume ratio of 3% by volume or more and 30% by volume or less, the binder phase is formed by an iron group metal and is included in the base material at a volume ratio of 8% by volume or more and 28% by volume or less, and a constituting ratio between the first hard phase and the second hard phase is such that the first hard phase is higher than the second hard phase in terms of volume ratio. It is to be noted that base material 4 may include an inevitable impurity in addition to the first hard phase, the second hard phase and the binder phase.

The tool for friction stir welding according to the present invention as mentioned above can be usefully used in, for example, a friction stir welding (FSW) application, a friction spot joining (spot FSW) application and the like. In particular, due to the above-mentioned configuration, coating layer 5 is less likely to peel off from base material 4 even under the harsh environment where heating and cooling are alternately repeated. Therefore, the tool for friction stir welding according to the present invention can be very usefully used in the spot FSW application in which the number of thermal shocks is significantly larger than that in the FSW application.

As shown in FIG. 1, tool 1 for friction stir welding according to the present invention is shaped to include a probe portion 2 having a small diameter (e.g., a diameter of 2 mm or more and 8 mm or less) and a cylindrical portion 3 having a large diameter (e.g., a diameter of 4 mm or more and 30 mm or less). When this is used for joining, probe portion 2 is rotated, with probe portion 2 inserted into or pressed against a joint portion of materials to be joined, and thereby the materials to be joined are joined. It is to be noted that a portion that comes into contact with the materials to be joined during joining processing is referred to as a shoulder portion.

In the friction stir welding application, probe portion 2 is pressed against or inserted into two materials to be joined that are stacked or butted in a line contact manner, and rotating probe portion 2 is moved linearly with respect to the stacked portion or the butted portion, and thereby the materials to be joined are joined. On the other hand, in the friction spot joining application, rotating probe portion 2 is pressed against a desired joint spot of two materials to be joined that are vertically stacked or butted, and rotation of probe portion 2 is continued at this location, and thereby the materials to be joined are joined.

In the present invention, when the materials to be joined are joined using the tool for friction stir welding, joining can be performed on the materials to be joined having a melting point of 1000° C. or higher. Using the tool for friction stir welding according to the present invention, joining can also be performed on the materials to be joined having a melting point of 1000° C. or higher, which has been considered to be difficult conventionally. Therefore, the tool for friction stir welding according to the present invention has very excellent industrial applicability. When the shoulder portion reaches a temperature of 800° C. or higher during joining of the materials to be joined, the tool for friction stir welding according to the present invention offers more excellent performance than that of conventional tools for friction stir welding.

As mentioned above, tool 1 for friction stir welding according to the present invention can be used in various applications, and particularly, can be suitably used for joining of high-tensile steel and ultrahigh-tensile steel, for which the resistance spot welding method has been mainly used conventionally. In other words, in joining of high-tensile steel, tool 1 for friction stir welding according to the present invention provides an alternative to the conventional resistance welding method. In friction stir welding, dynamic recrystallization occurs at the joint portion and the materials to be joined are joined in a solid-phase state, and thus, the structure becomes fine. As a result, the strength of the joint portion can be increased as compared with the conventional resistance welding method in which the materials to be joined change into a liquid phase during joining. Therefore, the tool for friction stir welding according to the present invention can be very effectively used for joining of high-tensile steel having high specific strength, and in particular, joining of ultrahigh-tensile steel of 980 MPa or more. Moreover, as for the tool for friction stir welding according to the present invention, the shoulder portion is excellent in oxidation resistance and the joining quality can be enhanced, although the number of thermal shocks is larger and the probe portion is exposed more easily to the oxidation environment in friction spot joining of such ultrahigh-tensile steel than in friction stir welding thereof. The tool for friction stir welding according to the present invention as mentioned above can be suitably used for joining of the materials to be joined that are made of a high-melting-point material. The tool for friction stir welding according to the present invention can also be used as a friction stir process.

<Base Material>

The base material used in the tool for friction stir welding according to the present invention includes the first hard phase, the second hard phase and the binder phase. The first hard phase is formed by WC particles. The second hard phase is formed by a compound of one or more metals selected from the group consisting of Ti, Zr, Hf, Nb, Ta, Cr, Mo, and W and one or more elements selected from the group consisting of nitrogen, carbon, boron, and oxygen, or a solid solution of the compound (except for WC), and is included in the base material at a volume ratio of 3% by volume or more and 30% by volume or less. The binder phase is formed by an iron group metal (Co, Ni, Fe) and is included in the base material at a volume ratio of 8% by volume or more and 28% by volume or less. A constituting ratio between the first hard phase and the second hard phase is such that the first hard phase is higher than the second hard phase in terms of volume ratio.

The base material of the tool for friction stir welding according to the present invention may include free carbon or an abnormal phase called η phase in the structure thereof.

The base material includes the WC particles as the first hard phase, and the first hard phase is preferably included in the base material at a volume ratio of 70% by volume or more and 95% by volume or less. As a result, the strength, the toughness and the heat crack resistance of the tool for friction stir welding can be enhanced. If the first hard phase is less than 70% by volume, the strength and the toughness of the tool for friction stir welding decrease and chipping is likely to occur during joining processing. On the other hand, if the first hard phase exceeds 95% by volume, a difference in thermal expansion coefficient between the base material and the coating layer becomes large, and thus, the coating layer is likely to peel off from the base material.

<First Hard Phase>

In the present invention, the first hard phase included in the base material is formed by the WC particles. The WC particles preferably have an average particle size of 0.5 μm or larger and 10 μm or smaller, more preferably 2 μm or larger, and still more preferably 3 μm or larger. As the average particle size of the WC particles becomes larger within the range not exceeding 10 μm, the fracture toughness can be enhanced, and thus, the heat crack resistance can be enhanced.

For the average particle size of the WC particles, a value obtained by measurement as described below is employed. First, using a scanning electron microscope (SEM) and electron probe micro-analysis (EPMA) included therewith, mapping is performed on the WC particles and the other components in a cross section of the tool for friction stir welding (plane perpendicular to a tip direction of the probe portion) (e.g., the WC particles and the other portions are color-coded in two colors). Then, the number of the WC particles present on an arbitrary line segment of 20 µm in the cross section is counted and a total length of regions occupied by the WC particles on the line segment is measured. Next, a value obtained by dividing the total length thus measured by the number of the WC particles is defined as a particle size of the WC particles. Then, similar measurement is performed on three line segments as the arbitrary line segment, to obtain an average value of the particle sizes of the individual WC particles. The average value is defined as the average particle size of the WC particles.

<Second Hard Phase>

In the present invention, the second hard phase is included in the base material at a volume ratio of 3% by volume or more and 30% by volume or less. The second hard phase is included in the base material together with the first hard phase, and has a composition with a thermal expansion coefficient larger than that of the WC particles. Since the base material includes such second hard phase, the thermal expansion coefficient of the base material can be brought close to the thermal expansion coefficient of the coating layer, and thus, the coating layer becomes less likely to peel off from the base material. Less than 3% by volume of the second hard phase is not preferable because the coating layer is likely to peel off. On the other hand, the second hard phase exceeding 30% by volume is not preferable because the heat crack resistance of the base material decreases.

The second hard phase is formed by a compound of one or more metals selected from the group consisting of Ti, Zr, Hf, Nb, Ta, Cr, Mo, and W and one or more elements selected from the group consisting of nitrogen, carbon, boron, and oxygen, or a solid solution of the compound (except for WC). A thermal expansion coefficient of this compound or solid solution thereof is relatively large, i.e., approximately $7 \times 10^{-6}/°C$. or more and $9 \times 10^{-6}/°C$. or less. Therefore, by inclusion of this in the base material, the thermal expansion coefficient of the base material can be brought close to the thermal expansion coefficient of the coating layer. As a result, the shear stress generated due to the difference in thermal expansion coefficient between the base material and the coating layer is relieved. Therefore, even when the tool for friction stir welding is exposed to the harsh environment where heating and cooling occur alternately, the stress is not applied in a direction of peeling the coating layer off, and the coating layer is less likely to peel off from the base material. As a result, oxidation of the base material near the shoulder portion is less likely to occur, and deterioration of the joining quality can also be made less likely.

The second hard phase is preferably formed by carbide, nitride or carbonitride of one or more metals selected from the group consisting of Ti, Zr, Hf, Nb, Ta, Cr, Mo, and W. This is because these compounds are particularly excellent in oxidation resistance. An exemplary suitable composition of these compounds can include, for example, carbide, nitride, carbonitride or the like of $(W_{1-x}Ti_x)$, $(Ta_{1-x}Nb_x)$, $(Ti_{1-x}Ta_x)$, $(Ti_{1-x}Zr_x)$, $(Ti_{1-x}Hf_x)$, or $(Ti_{1-x}Nb_x)$ (x represents any number not larger than 1) (a substance further including B, O or the like may also be included). In the above, an atomic ratio between nitrogen and carbon is not particularly limited and any conventionally known atomic ratios can be employed.

More preferably, the second hard phase can include TiCN, TiN, TaC, NbC, ZrC, TiTaNbC, TaNbC, TiTaWC, WTiC, TiTaNbWC, TiNbC, WTiTaCN, WTiTaNbCN, TiHfCN, TiZrCN and the like. In the present invention, when the atomic ratio is not particularly described, a conventionally known atomic ratio can be arbitrarily selected.

Preferably, a volume ratio of nitride and/or carbonitride to the second hard phase is 30% by volume or more and 100% by volume or less. Since the second hard phase includes nitride and/or carbonitride, the oxidation resistance of the tool for friction stir welding is enhanced, and thus, chipping of the tool for friction stir welding is less likely to occur. Moreover, since oxidation and expansion of a side surface of the shoulder portion of the base material are suppressed, a burr is also less likely to be produced at the joint portion of the materials to be joined, and thus, the joining quality of the materials to be joined is also enhanced.

More preferably, nitride and/or carbonitride included in the second hard phase can include TiN, ZrN, NbCN, TiCN, ZrCN, WTiCN, WTiTaCN, WTiNbCN and the like. In the present invention, when the atomic ratio is not particularly described, a conventionally known atomic ratio can be arbitrarily selected.

<Constituting Ratio Between First Hard Phase and Second Hard Phase>

In the present invention, the base material includes the first hard phase and the second hard phase as mentioned above, and a constituting ratio between the first hard phase and the second hard phase is such that the first hard phase is higher than the second hard phase in terms of volume ratio. In other words, the base material includes the second hard phase at a volume ratio lower than a volume ratio of the first hard phase. As a result, the heat crack resistance of the tool for friction stir welding can be enhanced, and thus, the chipping resistance of the tool for friction stir welding can be enhanced.

<Binder Phase>

In the present invention, the binder phase is included in the base material to combine the first hard phases, the second hard phases, or the first hard phase and the second hard phase. The binder phase is formed by the iron group metal and is included in the base material at a volume ratio of 8% by volume or more and 28% by volume or less. Co is preferably used as the binder phase that combines the first hard phases. Ni is preferably used as the binder phase that combines the second hard phases. A composition ratio when Co and Ni are used as the binder phase can be arbitrarily changed. It is to be noted that any material can be used for the binder phase as long as the material is formed by the iron group metal. In other words, the material used for the binder phase is not limited only to Co and Ni. Fe can also be used, and a solid solution of the element and the like constituting the first hard phase or the second hard phase may also be used. The base material includes the binder phase at a volume ratio of preferably 8% by volume or more and 28% by volume or less, and more preferably 10% by volume or more and 20% by volume or less. Less than 8% by volume of the binder phase is not preferable because the strength may be insufficient. If the binder phase exceeds 28% by volume, the volume ratio between the first hard phase and the second hard phase may decrease relatively and the properties such as hardness and plastic deformation resistance cannot be obtained sufficiently in some cases.

<Coating Layer>

Coating layer 5 is formed on base material 4 of tool 1 for friction stir welding according to the present invention. Coating layer 5 herein may be formed of only one layer having a single composition, or may be formed of two or more layers having different compositions. Since such coating layer 5 is provided, the effect of enhancing the properties such as wear resistance, oxidation resistance, toughness, and coloring property for identifying a used probe can be given. Although coating layer 5 is preferably formed to coat the entire surface of the base material, coating layer 5 may not coat a part of base material 4, or coating layer 5 may have a different configuration at any portion on base material 4. In addition, coating layer 5 may coat only the shoulder portion where oxidation is the most significant.

Preferably, a material having a thermal expansion coefficient of $7 \times 10^{-6}$ or more and $9 \times 10^{-6}$ or less is used as a material for the coating layer. More preferably, the coating layer is formed by nitride of one or more metals selected from the group consisting of Ti, Al, Cr, Si, Hf, Zr, Mo, Nb, Ta, V, and W.

Furthermore, the coating layer preferably has oxidation resistance at 1000° C. or higher. "Having oxidation resistance at 1000° C. or higher" herein means that weight increase occurs at 1000° C. or higher as a result of evaluation of the coating layer in the atmosphere using a thermogravimetry/differential thermal analysis (TG/DTA) device. An exemplary suitable composition of the coating layer having such oxidation resistance can include AlTiSiN, AlCrN, TiZrSiN, CrTaN, HfWSiN, CrAlN and the like.

The coating layer according to the present invention is preferably formed by a physical vapor deposition method (PVD method). This is because a film forming process capable of forming a compound with high crystallinity is preferable to form the coating layer according to the present invention on the surface of the base material, and as a result of study of various film forming methods, the physical vapor deposition method was found to be most suitable for suppressing oxidation of the base material because the coating layer after film formation is dense and a crack is less likely to be produced in the coating layer. The physical vapor deposition method includes, for example, a sputtering method, an ion plating method and the like. Particularly when a cathode arc ion plating method with a high ionization rate of source element is used, metal or gas ion bombardment processing can be performed on the surface of the base material before forming the coating layer, and thus, adhesiveness between the coating layer and the base material is greatly enhanced. Therefore, the cathode arc ion plating method is preferable.

EXAMPLE

While the present invention will be described in more detail hereinafter with reference to Examples, the present invention is not limited thereto.

Examples 1 to 11

Comparative Examples 1 to 5

First, the material forming the first hard phase, the material forming the second hard phase as shown in Table 1 below, and Co forming the binder phase were mixed at volume ratios described in Table 1 below, and thereby the mixed powder was obtained. The WC particles having average particle sizes shown in Table 1 were used as the material forming the first hard phase, and the Co powder having an average particle size of 0.5 μm was used as the material forming the binder phase.

Ethanol was added to the above-mentioned mixed powder and the powder was stirred for seven hours by using an attritor. There was thus obtained slurry in which the material for the first hard phase, the material for the second hard phase, and the material for the binder phase were mixed. Then, the ethanol contained in this slurry was volatilized. A sintered body raw material was thus obtained.

This sintered body raw material was filled into a die made of cemented carbide and was monoaxially pressed at a pressure of 100 MPa. A press molded body was thus obtained. This press molded body was sintered in a vacuum at a temperature of 1450° C. for one hour, and was ground into a predetermined shape. Thereafter, a $Ti_{0.5}Al_{0.5}N$ layer having a thickness of 10 nm and a $Al_{0.7}Cr_{0.3}N$ layer having a thickness of 10 nm were alternately stacked on a surface thereof to form the coating layer having a total thickness of 3 μm by using the arc ion plating method. The tool for friction stir welding in each Example and each Comparative Example was thus fabricated.

The tool for friction stir welding fabricated as described above has the shape as shown in FIG. 1, and has cylindrical portion 3 having a substantially cylindrical shape whose diameter is 8 mm and whose height is 30 mm, and probe portion 2 protruding concentrically with cylindrical portion 3 at a central portion of the tip of cylindrical portion 3. Probe portion 2 has a substantially cylindrical shape whose diameter is 4 mm and whose height is 1.8 mm. The oxidation resistance of the coating layer formed in the above was evaluated by using the thermogravimetry/differential thermal analysis device (product name: TG-DTA2020SA (manufactured by Bruker AXS K.K.)), and the evaluation revealed that the oxidation start temperature was 1010° C. and the coating layer has the oxidation resistance at 1000° C. or higher.

The tool for friction stir welding in each of Examples 5 to 7 is different from the tool for friction stir welding in Example 3 in that the composition ratio of nitride and carbonitride forming the second hard phase is different as shown in the section "nitride, carbonitride" in Table 1. The tool for friction stir welding in each of Examples 8 and 9 is different from the tool for friction stir welding in Example 2 in that the average particle size of the WC particles is different as shown in the section "average particle size" in Table 1. Furthermore, the tool for friction stir welding in each of Examples 10 and 11 is different from the tool for friction stir welding in Example 2 in that the volume ratio of the binder phase is different as shown in the section "binder phase" in Table 1.

The tool for friction stir welding according to the present invention in each of Examples 1 to 11 thus fabricated is used in friction stir welding processing and includes the base material and the coating layer formed on the base material, the base material includes the first hard phase, the second hard phase and the binder phase, the first hard phase contains the WC particles, the second hard phase contains a compound of one or more metals selected from the group consisting of Ti, Zr, Hf, Nb, Ta, Cr, Mo, and W and one or more elements selected from the group consisting of nitrogen, carbon, boron, and oxygen, or a solid solution of the compound, and is included in the base material at a volume ratio of 3% by volume or more and 30% by volume or less, the binder phase contains the iron group metal and is included in the base material at a volume ratio of 8% by volume or more and 28% by volume or less, and a constituting ratio between the first hard phase and the second hard phase is such that the first hard phase is higher than the second hard phase in terms of volume ratio.

TABLE 1

| | first hard phase | | second hard phase | | | |
|---|---|---|---|---|---|---|
| | vol. % | average particle size (μm) | composition (vol. %) | total volume (vol. %) | nitride carbonitride (vol. %) | binder phase (vol. %) |
| Example 1 | 85 | 3.3 | TaC(2.5), ZrCO(0.5) | 3 | — | 12 |
| Example 2 | 77 | 3.3 | TiNbC(8), TaC(3) | 11 | — | 12 |
| Example 3 | 69 | 3.3 | TiC(14), ZrC(5) | 19 | — | 12 |
| Example 4 | 60 | 3.3 | TiNbC(13), TiC(15) | 28 | — | 12 |
| Example 5 | 69 | 3.3 | TiC(14), ZrN(5) | 19 | 30 | 12 |
| Example 6 | 69 | 3.3 | TiC(7), TiCN(7), ZrN(5) | 19 | 60 | 12 |
| Example 7 | 69 | 3.3 | TiCN(14), ZrN(5) | 19 | 100 | 12 |
| Example 8 | 77 | 0.9 | TiNbC(8), TaC(3) | 11 | — | 12 |
| Example 9 | 77 | 4.8 | TiNbC(8), TaC(3) | 11 | — | 12 |
| Example 10 | 81 | 3.3 | TiNbC(8), TaC(3) | 11 | — | 8 |
| Example 11 | 61 | 3.3 | TiNbC(8), TaC(3) | 11 | — | 28 |
| Comparative Example 1 | 88 | 0.9 | — | — | — | 12 |
| Comparative Example 2 | 86 | 0.9 | TiC(2) | 2 | — | 12 |
| Comparative Example 3 | 54 | 0.9 | NbC(17), TiC(17) | 34 | — | 12 |
| Comparative Example 4 | 30 | 0.9 | TiNbC(15), TiC(15) | 30 | — | 40 |
| Comparative Example 5 | 87 | 3.3 | TiNbC(8), TaC(3) | 11 | — | 2 |

The tool for friction stir welding in each Example and each Comparative Example obtained in the above was mirror polished. Then, a photograph of a crystalline structure of the tool for friction stir welding at an arbitrary region was taken at 10000× magnification by using the scanning electron microscope (SEM), and mapping was performed on the WC particles, carbide, carbonitride and nitride of the second hard phase, and the component of the binder phase in a cross section of the tool for friction stir welding (plane perpendicular to a tip direction of the probe portion) by using the electron probe micro-analysis (EPMA) included with the SEM. Then, on the 10000× photograph taken in the above, the components were checked and the WC particles, carbide, carbonitride and nitride of the second hard phase, and the binder phase were identified by using image processing software. A total area of each of the WC particles, carbide, carbonitride and nitride of the second hard phase, and the binder phase was calculated on the photograph, and a percentage of the ratio of each of the WC particles, the second hard phase and the binder phase occupied in the tool for friction stir welding in the photograph was calculated. As a result, the blend ratio of each raw material described above could be regarded as being identical to the volume ratio of each composition of the tool for friction stir welding obtained finally.

Next, in the cross section, the number of the WC particles present on an arbitrary line segment of 20 μm was counted and a total length of regions occupied by the WC particles on the line segment was measured. The WC particles were identified by discerning an element by the EPMA. A value obtained by dividing the total length thus measured by the number of the WC particles was defined as the particle size of the WC particles, and similar measurement was performed on three line segments as the arbitrary line segment. The average particle size of the WC particles was thus obtained.

<Evaluation of Tool for Friction Stir Welding>

Under the conditions shown in Table 2 below, a wear test imitating friction spot joining (FSJ) was performed at 3000 spots using the tool for friction stir welding in each Example and each Comparative Example fabricated in the above.

TABLE 2

| | | evaluation of wear resistance |
|---|---|---|
| materials to be joined | material | high-tensile steel |
| | tensile strength (MPa) | 780 |
| | plate thickness (mm) | 9 |
| joining condition | number of rotations (r.p.m) | 1000 |
| | indentation speed (mm/sec) | 0.5 |
| | indentation depth (mm)* | 1.8 |
| | indentation load (ton) | 1.5 |
| | processing time (sec) | 2 |

*"Indentation depth" in Table 2 refers to a penetration depth of the probe tip.

In the above, after performing the friction spot joining test at 3000 spots, the tool for friction stir welding was immersed in hydrochloric acid, and an adhesion matter that has adhered to the surface thereof was removed while heating the hydrochloric acid for 10 minutes, and inner diameters of the shoulder portion and the probe portion of the tool for friction stir welding were measured by using a vernier caliper. A difference between the inner diameter of the shoulder portion before friction spot joining and the inner diameter of the shoulder portion after friction spot joining as well as a difference between the inner diameter of the probe portion before friction spot joining and the inner diameter of the probe portion after friction spot joining were thus evaluated as an amount of wear, and were indicated in the section "amount of wear (mm)" in Table 3. Table 3 shows that as the amount of wear is smaller, the wear resistance is better.

TABLE 3

| | | amount of wear (mm) | | height |
|---|---|---|---|---|
| | number of indentations | probe portion | shoulder portion | of burr (mm) |
| Example 1 | 3000 | 0.25 | 0.22 | 0.67 |
| Example 2 | 3000 | 0.2 | 0.19 | 0.54 |
| Example 3 | 3000 | 0.18 | 0.18 | 0.5 |
| Example 4 | 3000 | 0.21 | 0.15 | 0.41 |
| Example 5 | 3000 | 0.18 | 0.15 | 0.35 |
| Example 6 | 3000 | 0.17 | 0.14 | 0.31 |
| Example 7 | 3000 | 0.17 | 0.13 | 0.28 |
| Example 8 | 3000 | 0.23 | 0.21 | 0.58 |
| Example 9 | 3000 | 0.16 | 0.17 | 0.38 |

TABLE 3-continued

|  | | amount of wear (mm) | | height |
|---|---|---|---|---|
|  | number of indentations | probe portion | shoulder portion | of burr (mm) |
| Example 10 | 3000 | 0.18 | 0.17 | 0.49 |
| Example 11 | 3000 | 0.25 | 0.26 | 0.72 |
| Comparative Example 1 | 3000 | 0.32 | 0.55 | 1.2 |
| Comparative Example 2 | 3000 | 0.3 | 0.52 | 1.2 |
| Comparative Example 3 | 3000 | 0.35 | 0.45 | 1.1 |
| Comparative Example 4 | 100 | test was stopped due to plastic deformation | | |
| Comparative Example 5 | 100 | test was stopped due to chipping | | |

A height of a burr protruding most from the surface of the materials to be joined after the joining test was indicated in the section "height of burr" in Table 3. Table 3 shows that as the height of the burr is lower, the joining quality is better.

In Comparative Example 4, the amount of wear at the probe portion exceeded 0.5 mm when 100 indentations ended. Therefore, the amount of wear and the height of the burr at that point were measured.

As is clear from Table 3, the amounts of wear at the probe portion and the shoulder portion were smaller in the tool for friction stir welding according to the present invention in each of Examples 1 to 11 than in the tool for friction stir welding in each of Comparative Examples 1 to 5. Therefore, enhancement of the wear resistance of the tool for friction stir welding was clearly seen. In addition, the height of the burr was lower in the tool for friction stir welding according to the present invention in each of Examples 1 to 11 than in the tool for friction stir welding in each of Comparative Examples 1 to 5. Therefore, enhancement of the joining quality of the tool for friction stir welding was clearly seen.

As for the tool for friction stir welding in each of Examples 5 to 7, the volume ratio of nitride and/or carbonitride to the second hard phase was 30% by volume or more and 100% by volume or less. Therefore, the oxidation resistance of the base material was enhanced. Moreover, since the thermal expansion coefficient of the base material was large, peel-off of the coating layer from the base material was less likely to occur, and thus, peel-off of the coating layer could be suppressed. Therefore, the shoulder portion was excellent in oxidation resistance and the joining quality could be enhanced.

The average particle size of the WC particles was smaller in the tool for friction stir welding in Example 8 than in the tool for friction stir welding in Example 2. Therefore, the heat crack resistance of the tool for friction stir welding decreased, and thus, damage was somewhat likely to occur due to a heat crack at the probe portion. In contrast, the average particle size of the WC particles was larger in the tool for friction stir welding in Example 9 than in the tool for friction stir welding in Example 2. Therefore, the heat crack resistance of the tool for friction stir welding was enhanced, and thus, damage could be made less likely to occur due to a heat crack at the probe portion.

The volume ratio of the Co binder phase was lower in the tool for friction stir welding in Example 10 and higher in the tool for friction stir welding in Example 11 than in the tool for friction stir welding in Example 2. With this as well, there could be obtained wear resistance and joining quality that were as excellent as in the tool for friction stir welding in Example 2.

The reason why the wear resistance and the joining quality of the tool for friction stir welding in each of Comparative Examples 1 and 2 were not excellent is considered as follows: since the volume ratio of the second hard phase was too low, the coating layer was likely to peel off and oxidation was likely to occur at the shoulder portion. On the other hand, the reason why the heat crack resistance of the tool for friction stir welding in Comparative Example 3 was not excellent is considered as follows: since the volume ratio of the second hard phase was too high, the strength of the base material decreased.

The reason why the tool for friction stir welding in Comparative Example 4 was plastically deformed and the test was stopped when 100 indentations ended is considered as follows: since the volume ratio of Co was too high, the base material softened and the plastic deformation resistance decreased.

The reason why chipping of the tool for friction stir welding in Comparative Example 5 occurred and the test was stopped when 100 indentations ended is considered as follows: since the volume ratio of Co was too low, the strength of the base material was insufficient and the chipping resistance decreased.

Examples 12 and 13

In Example 12, the tool for friction stir welding similar to that in Example 7 was prepared, except that a $Al_{0.6}Ti_{0.35}Si_{0.05}N$ layer having an oxidation start temperature of 1130° C. and having a thickness of 3 μm was used as the coating layer. In Example 13, the tool for friction stir welding similar to that in Example 7 was prepared, except that a $Ti_{0.5}Al_{0.5}N$ layer having an oxidation start temperature of 970° C. and having a thickness of 3 μm was used as the coating layer. Then, evaluation similar to the evaluation of the wear resistance mentioned above was made. The result is shown in Table 4.

TABLE 4

|  | coating layer composition | number of indentations | amount of wear (mm) | | height of burr (mm) |
|---|---|---|---|---|---|
|  |  |  | probe portion | shoulder portion |  |
| Example 12 | $Al_{0.6}Ti_{0.35}Si_{0.05}N$ | 3000 | 0.14 | 0.08 | 0.17 |
| Example 13 | $Ti_{0.5}Al_{0.5}N$ | 3000 | 0.24 | 0.25 | 0.43 |

As is clear from Table 4, the oxidation start temperature of the coating layer in Example 12 exceeded 1000° C. and was higher than the oxidation start temperature of the coating layer in Example 7. Therefore, the tool for friction stir welding in Example 12 exhibited more excellent wear resistance than the tool for friction stir welding in Example 7. On the other hand, the oxidation start temperature of the coating layer in Example 13 was lower than 1000° C. Therefore, the tool for friction stir welding in Example 13 was inferior in wear resistance to the tool for friction stir welding in Example 7.

While the embodiments and examples of the present invention have been described above, it is also originally intended to combine configurations of the above-mentioned embodiments and examples as appropriate.

It should be understood that the embodiments and examples disclosed herein are illustrative and not limitative in any respect. The scope of the present invention is defined by the terms of the claims, rather than the description above, and is intended to include any modifications within the scope and meaning equivalent to the terms of the claims.

REFERENCE SIGNS LIST 1 tool for friction stir welding; 2 probe portion; 3 cylindrical portion; 4 base material; 5 coating layer.

The invention claimed is:

1. A tool for friction stir welding used in friction stir welding processing, wherein
said tool for friction stir welding includes a base material and a coating layer formed on the base material,
said base material includes a first hard phase, a second hard phase and a binder phase,
said first hard phase is formed by WC particles,
said second hard phase is formed by a compound of one or more metals selected from the group consisting of Ti, Zr, Hf, Nb, Ta, Cr, Mo, and W and one or more elements selected from the group consisting of nitrogen, carbon, boron, and oxygen, or a solid solution of the compound (except for WC), and is included in said base material at a volume ratio of 3% by volume or more and 30% by volume or less,
said binder phase is formed by an iron group metal and is included in said base material at a volume ratio of 8% by volume or more and 28% by volume or less, and
a constituting ratio between said first hard phase and said second hard phase is such that said first hard phase is higher than said second hard phase in terms of volume ratio,
wherein the coating layer comprises an $Al_{0.6}Ti_{0.35}Si_{0.05}N$ layer, or a $Ti_{0.5}Al_{0.5}N$ layer and an $Al_{0.7}Cr_{0.3}N$ layer alternately stacked.

2. The tool for friction stir welding according to claim 1, wherein
said second hard phase is formed by carbide, nitride or carbonitride of one or more metals selected from the group consisting of Ti, Zr, Hf, Nb, Ta, Cr, Mo, and W.

3. The tool for friction stir welding according to claim 1, wherein
a volume ratio of nitride and/or carbonitride to said second hard phase is 30% by volume or more and 100% by volume or less.

4. The tool for friction stir welding according to claim 1, wherein
said WC particles have an average particle size of 3 μm or larger.

5. The tool for friction stir welding according to claim 1, wherein
said coating layer is formed by a physical vapor deposition method.

6. The tool for friction stir welding according to claim 1, wherein
friction stir welding processing using said tool for friction stir welding is friction spot joining.

7. The tool for friction stir welding according to claim 1, wherein
said coating layer is formed by nitride of one or more metals selected from the group consisting of Ti, Al, Cr, Si, Hf, Zr, Mo, Nb, Ta, V, and W.

* * * * *